United States Patent [19]

Sullivan

[11] 4,307,627
[45] Dec. 29, 1981

[54] AIR COOLED DAMPER

[75] Inventor: Francis G. Sullivan, Coldwater, Mich.

[73] Assignee: Simpson Industries Inc., Litchfield, Mich.

[21] Appl. No.: 94,490

[22] Filed: Nov. 15, 1979

[51] Int. Cl.³ .............................................. F16F 15/12
[52] U.S. Cl. ...................................... 74/574; 64/1 V; 64/27 NM
[58] Field of Search ...................... 74/574, 572, 573 R, 74/411, 461, DIG. 10; 188/1 B; 192/3 R, 113 A; 64/1 V, 11 R, 14, 27 NM; 165/47, 69; 180/165

[56] References Cited

U.S. PATENT DOCUMENTS

| 2,584,190 | 2/1952 | Danly et al. | 192/113 A X |
|---|---|---|---|
| 2,594,555 | 4/1952 | Hardy | 74/574 |
| 2,716,904 | 9/1955 | Schuldt | 74/574 |
| 2,779,210 | 1/1957 | Holloway | 74/574 |
| 2,976,975 | 3/1961 | Thostenson et al. | 192/113 A X |
| 3,280,654 | 10/1966 | Arnt, Jr. | 74/574 |
| 3,314,304 | 4/1967 | Katzenberger et al. | 74/574 |
| 3,443,454 | 5/1969 | Hall | 74/574 |
| 3,678,708 | 4/1972 | Ernst et al. | 64/11 R |
| 3,727,431 | 4/1973 | Yokel | 64/14 X |
| 3,805,935 | 4/1974 | Armstrong | 192/113 A |
| 3,945,269 | 3/1976 | Bremmer, Jr. | 74/574 |

Primary Examiner—C. J. Husar
Assistant Examiner—Moshe I. Cohen
Attorney, Agent, or Firm—Beaman & Beaman

[57] ABSTRACT

An air cooled torsional vibration damper utilizing air passages for producing circulation of cooling air. An inertia ring of a composite construction includes a high thermal conductivity metal adjacent a heat producing elastomer, and a denser metal ring adds mass. Air passages, including a radial passage portion, are defined in the inertia ring adjacent the engaging surfaces of the ring components.

8 Claims, 7 Drawing Figures

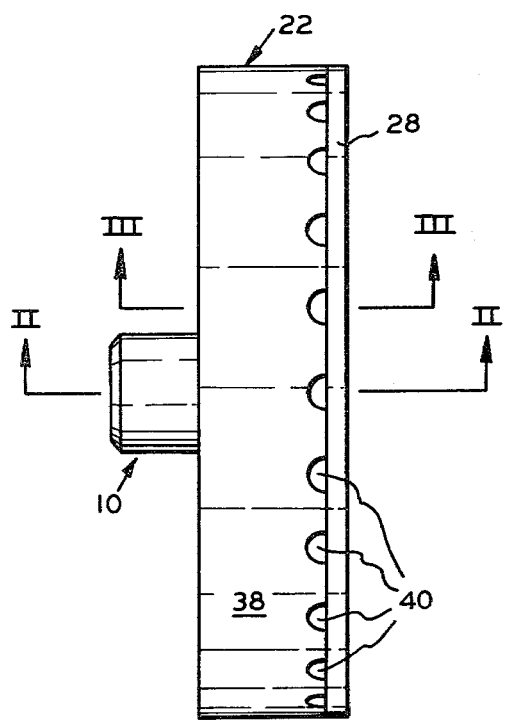
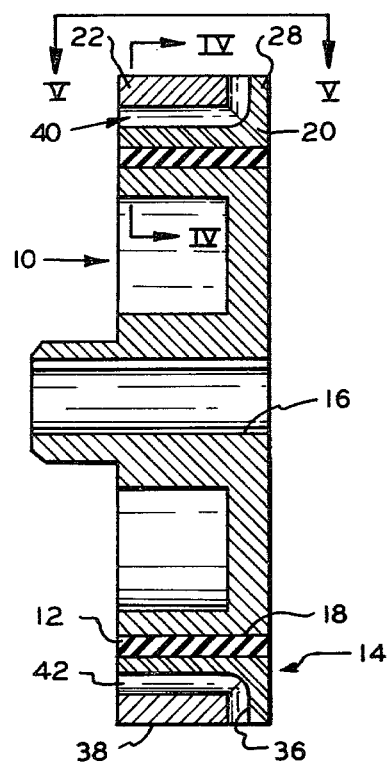
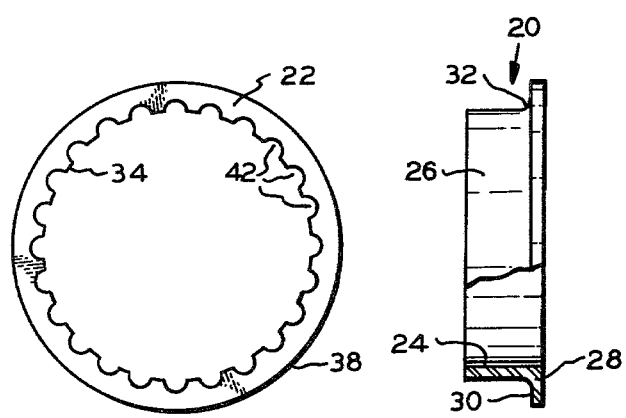
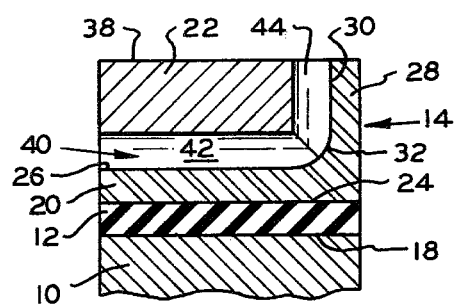
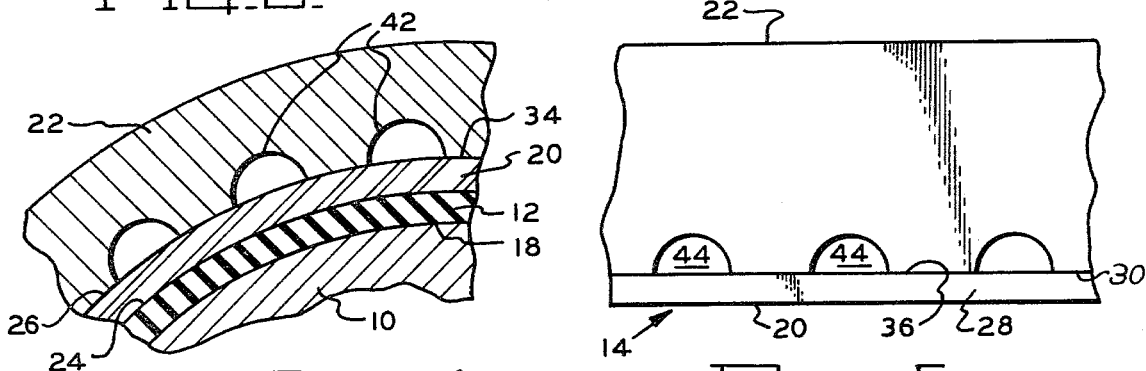

AIR COOLED DAMPER

BACKGROUND OF THE INVENTION

Torsional vibration dampers are employed with engines utilizing crankshafts to absorb and damp vibrations occurring within the crankshaft. Such dampers are normally mounted exteriorly of the engine block on the end of the crankshaft, and may include pulley components for driving alternators, power steering pumps, air conditioners, and other accessory equipment.

The basic torsional vibration damper includes a hub member directly mounted upon the crankshaft, an elastomer mounted on the hub member, and an inertia member mounted on the elastomer. Vibrations existing within the hub member are transferred to the inertia member through the elastomer, and the radial separation of the inertia member from the axis of rotation, and its mass, damp vibrations within the hub member and crankshaft. The energy produced by the damping action causes the elastomer to heat due to its internal movement and stress, and this heat is dissipated through the hub and inertia members.

The elevated temperatures which may occur in heavy duty vibration dampers can reach such values as to deteriorate and destroy the elastomer, and it is known to utilize cooling means with torsional vibration dampers to minimize deleterious thermal problems. Such cooling devices may include fins, such as shown in U.S. Pat. No. 3,314,304, or may include passages and openings through which air passes as the damper rotates, such as shown in U.S. Pat. Nos. 2,594,555; 2,716,904; 2,779,210; 3,443,454 and 3,678,708. While such prior dampers utilizing air passages do tend to reduce the damper operating temperatures, such prior devices have not achieved heat dissipation characteristics totally acceptable with heavy duty vibration dampers as employed with truck and industrial engines.

It is an object of the invention to provide a torsional vibration damper capable of absorbing heavy vibrations and dissipating the heat generated within the damper wherein a long operative life of the elastomer is achieved.

A further object of the invention is to provide a torsional air cooled vibration damper employing a composite inertia ring wherein a metal ring of high thermal conductivity is utilized in direct engagement with the elastomer, and a high density metal ring is mounted upon the thermal conducting ring, and air passages are defined in one of the rings adjacent the mating surfaces thereof for the effective dissipation of heat transferred to the inertia ring by the elastomer.

A further object of the invention is to provide a torsional air cooled vibration damper utilizing cooling air passages having both axial and radial portions, wherein the air passages are economically and accurately formed, and wherein air flow therethrough is effectively achieved.

A hub member is attached to the crankshaft to be damped, and the hub member includes a cylindrical peripheral surface upon which an elastomer is mounted. An annular inertia ring having an inner cylindrical surface is mounted upon the elastomer, and in practice, the elastomer may be inserted intermediate the hub and inertia ring surfaces under tension in the manner described in the assignee's U.S. Pat. No. 3,280,654. The inertia ring includes a first annular inertia member formed of a metal having a high rate of thermal conductivity, such as aluminum, and this inner member directly engages the elastomer in heat transfer relationship thereto. The first inertia member includes a cylindrical surface concentric with the axis of rotation, and also includes a radial shoulder surface defined upon a radial projection formed on the first member.

A second inertia member of annular configuration is firmly and intimately mounted upon the first member cylindrical surface, such as by an inteference fit, and the second member engages both the cylindrical and shoulder surfaces of the first member. A plurality of air passages are defined in the second member adjacent the surfaces thereof which engage the first member wherein air flowing through the air passages passes over exposed surfaces of the heat conductive first member dissipating the heat transferred thereto by the elastomer.

The second member is preferably formed of a relatively high density metal such as steel or cast iron, and the air passages preferably includes both axial and radially extending portions jointed at an intersection having a radius surface to aid in air flow. The air passages intersect the periphery of the inertia member, and air passages may be randomly spaced about the axis of rotation to control audible vibrations which may be produced thereby.

BRIEF DESCRIPTION OF THE DRAWINGS

The aforementioned objects and advantages of the invention will be appreciated from the following description and accompanying drawings wherein:

FIG. 1 is an elevational view of a vibration damper in accord with the invention, FIG. 2 is a diametrical, elevational, sectional view of the damper as taken along Section II—II of FIG. 1, FIG. 3 is an enlarged, elevational, detail sectional view as taken along Section III—III of FIG. 1, FIG. 4 is an enlarged, detail, elevational sectional view as taken along Section IV—IV of FIG. 2, FIG. 5 is an enlarged, plan, detail view of the periphery of the vibration damper as taken along Section V—V of FIG. 2, FIG. 6 is an elevational view of the outer inertia ring member, and FIG. 7 is a side elevational view of the inner inertia ring member, partially in section.

DESCRIPTION OF THE PREFERRED EMBODIMENT

The basic components of a torsional vibration damper in accord with the invention include a hub member 10, an elastomer member 12, and an inertia ring 14. These basic components may be assembled in the manner described in the assignee's U.S. Pat. No. 3,280,654.

The hub member 10 includes a keyed bore 16 whereby the hub member may be mounted upon the crankshaft to be damped by means of a key, spline or the like wherein the hub member is affixed against relative rotation to the crankshaft. The hub includes a cylindrical peripheral surface 18 concentric with the axis of hub member rotation, and the elastomer 12 is mounted upon the peripheral surface 18 in a tensioned manner as described in U.S. Pat. No. 3,280,654.

The elastomer 12 may be rubber, neoprene, or other suitable material, and may be folded as shown in the assignee's above mentioned patent, or could be otherwise mounted upon the surface 18. The elastomer 12 serves to mount the inertia ring 14 upon the hub member 10, and it is the molecular movement occurring within the elastomer during operation of the damper which generates the heat to be dissipated.

The inertia ring 14 is of a composite construction utilizing a first inner inertia member 20, and a second outer inertia member 22. The inner member 20 is of an annular configuration having an inner cylindrical surface 24 in firm engagement with the elastomer 12 such that relative angular rotation between the elastomer and inner member does not occur. The member 20 also includes a concentric axially extending cylindrical surface 26, and the radially extending projection 28 defines a radial surface 30 which intersects surface 26 at the concave radius 32. The inner member 20 is formed of a metal having a high rate of thermal conductivity such as aluminum, and the heat generated within the elastomer 12 will be efficiently transmitted to the member 20 due to its intimate engagement therewith, and ability to conduct heat.

The outer inertia member 22 is also of an annular configuration and includes an inner cylindrical surface 34 of a diameter which produces an interference fit with the inner member surface 26 when forced thereon as apparent in FIGS. 2 and 4. The member 22 also includes a planar end surface 36 adapted to closely engage the inner member surface 30 as will be appreciated from FIGS. 1 and 5. The outer cylindrical surface 38 is of a diameter substantially equal to the diameter of the projection 28 producing an overall configuration which will be apparent in FIG. 1. The outer member 22 is preferably formed of a high density material, such as steel or cast iron, wherein sufficient weight exists to render the inertia ring capable of absorbing the intended vibrations.

A plurality of air passages 40 are defined in the outer member 22 intersecting the surfaces 34 and 36. The passages 40 each include an axially extending portion 42, FIG. 3, and a radially extending portion 44. As the air passages intersect the surfaces 34 and 36 the air passing therethrough is also in direct engagement with the inner member 20 and due to the existence of the radial portions 44 the rapid rotation of the damper draws air through the air passages due to centrifugal force, dissipating the heat within the inner member 20, and the heat transferred from member 20 to member 22.

The passages 40 may be readily formed within the outer member 22 by originally forming the member 22 as a ring having a rectangular cross section. Axial and radial holes are then drilled in the member 22, and the member then machined removing material from the bore and end thereof resulting in the configuration shown in FIG. 6. If desired, the passages 40 may be randomly angularly spaced relative to the axis of rotation to control audible vibrations during damper rotation.

It will be appreciated that the air passages could be formed in the inner member 20 rather than in the outer member 22, and such construction would also result in effective cooling. The fact that the axial portions 42 of the passages are adjacent the elastomer 12 aids in the rapid transfer of heat to the air flowing therethrough, and the passage configuration constitutes an effective air pump.

Of course, belt grooves, or the like may be formed in the outer member 22, if desired, and it is to be understood that the configuration of the inertia ring 14 may distinguish from that illustrated without departing from the scope of the invention, and it is intended that modifications or embodiments within the inventive concept apparent to those skilled in the art be within the scope of the invention.

I claim:

1. An air cooled vibration damper for rotary shafts comprising, in combination, a hub member having an axis of rotation and a cylindrical surface radially spaced from said axis and concentric thereto, an elastomer member mounted on said hub surface having a hub engaging surface and an inertia element engaging surface defined thereon, a first annular metallic inertia element formed of a metal having a high rate of thermal conduction mounted upon said elastomer member inertia element engaging surface in direct association therewith, a second annular inertia element formed of a high density material mounted upon said first element for rotation therewith, and a plurality of air passages defined in one of said elements located adjacent the engaging surfaces of said elements, said passages each including an axially extending portion and a radially extending portion.

2. In an air cooled vibration damper as in claim 1, said first inertia element including a cylindrical surface concentric to said hub member cylindrical surface, said passages' axially extending portions being adjacent said first inertia element cylindrical surface.

3. In an air cooled vibration damper as in claim 1, said first element being formed of aluminum, and said second element being formed of steel.

4. An air cooled vibration damper for rotary shafts wherein a hub member mounted upon the shaft to be damped includes an axis and annular inertia member mounted thereon by an annular elastomer, the improvement comprising, the inertia member being of a composite construction including a first element of a metal of high thermal conductivity disposed in direct engagement with the elastomer and a second element of a high density metal directly mounted upon said first element and in radially spaced relationship to said elastomer, and a plurality of cooling air passages defined adjacent to and in heat exchanging relationship to said first element each having a radially extending portion.

5. In an air cooled vibration damper as in claim 4, said first element being formed of aluminum and said second element being formed of steel.

6. An air cooled vibration damper for rotary shafts comprising, in combination, a hub member having an axis of rotation and a concentric cylindrical peripheral surface, an annular elastomeric member mounted on said peripheral surface, an inertia ring comprising a first annular inertia member formed of aluminum directly mounted upon said elastomeric member having a cylindrical surface concentric to said axis of rotation, a second annular inertia member formed of steel directly mounted upon said first member cylindrical surface, and a plurality of open end air passages defined in said inertia ring at said first member cylindrical surface, said passages each including a radially extending portion and an axially extending portion parallel to said first member cylindrical surface.

7. In an air cooled vibration damper for rotary shafts as in claim 6, said air passages being defined in said second inertia member.

8. In an air cooled vibration damper for rotary shafts as in claim 6, said first member including a radial shoulder intersecting said first member cylindrical surface, said air passages being defined in said second member adjacent said first member cylindrical surface and shoulder.

* * * * *